United States Patent
Yamagiwa (10) Patent No.: US 6,722,410 B1
(45) Date of Patent: Apr. 20, 2004

(54) METHOD OF MANUFACTURING TIRE TUBES, AND TIRE TUBE

(75) Inventor: Toshio Yamagiwa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/622,036

(22) PCT Filed: Feb. 8, 1999

(86) PCT No.: PCT/JP99/00529

§ 371 (c)(1),
(2), (4) Date: Aug. 22, 2000

(87) PCT Pub. No.: WO99/44812

PCT Pub. Date: Sep. 10, 1999

(30) Foreign Application Priority Data

Mar. 5, 1998 (JP) .............................................. 10/53546
Dec. 24, 1998 (JP) ........................................... 10/366253

(51) Int. Cl.⁷ .............................. B60C 5/04; B29D 23/24
(52) U.S. Cl. ...................................... 152/511; 156/118
(58) Field of Search ............................... 152/511, 512, 152/195, 454; 156/118, 119, 120, 121, 122

(56) References Cited

U.S. PATENT DOCUMENTS 1,285,719 A * 11/1918 Jeffries ........................ 152/512
2,041,534 A * 5/1936 Eger ............................ 152/511
2,060,714 A   11/1936 Andrews
2,226,453 A * 12/1940 Vretman ...................... 152/195
2,527,204 A * 10/1950 Vickers ....................... 156/122
2,606,135 A * 8/1952 Iknayan ....................... 156/118

FOREIGN PATENT DOCUMENTS

| CN | 1172740 A   |   | 2/1998 |
| JP | 60-124505   |   | 7/1985 |
| JP | 9-164806    |   | 6/1997 |
| JP | 9-174710    |   | 7/1997 |
| JP | 10-16518 A  | * | 1/1998 |

* cited by examiner

*Primary Examiner*—Geoffrey L. Knable
(74) *Attorney, Agent, or Firm*—Arent Fox PLLC

(57) ABSTRACT

The tube material 2' extrusion-molded by the extrusion molding machine has an air chamber peripheral wall 3i, a sealant chamber peripheral wall 3o and a partition wall 4. An air chamber 5 is defined between the air chamber peripheral wall 3i and the partition wall 4, and a sealant chamber 6 is defined between the sealant chamber peripheral wall 3o and the partition wall 4. On the air chamber peripheral wall 3i are protrusively formed a plurality of rib-shaped projections 15 each forming a thick portion for reinforcement. The thickness $t_3$ of each of the projections is approximately equal to the thickness $t_1$ of the peripheral wall 3 and the thickness $t_2$ of the partition wall 4. It is possible to efficiently extrusion-mold the tube material 2' having the thick portions for reinforcement by thus approximately equalizing the thickness of each part of the tube material 2 including the rib-shaped projections 15.

5 Claims, 13 Drawing Sheets

FIG.12

METHOD OF MANUFACTURING TIRE TUBES, AND TIRE TUBE

FIELD OF THE INVENTION

The present invention relates to a tire tube manufacturing method for molding a tube material by an extrusion process and subsequently for vulcanizing the tube material by a vulcanizing process, and to a tire tube manufactured by the manufacturing method.

PRIOR ART

When the radial load acts on a vehicle wheel mounted with a tube-incorporated tire, the tire and the tube are subjected to deformation with the load. However, particularly when the tire runs on a hard obstacle such as a rock during off-road traveling, or when the vehicle jumps and touches the ground, the tube is pressed hard between the tire largely deformed and a metal rim, there occurs in some cases the rim-hitting phenomenon that the inner wall surfaces of the tube abut against each other. If the inner wall surfaces of the tube abut against each other because of such rim-hitting phenomenon, the durability of the abutment portion may decrease in some cases.

The decrease in the durability of the abutment portion stated above can be prevented, as proposed by Japanese Patent Application Laid-open No. 9-164806, by providing a projection of a thick portion on the wall surface of the tube for reinforcement, which wall surface is likely to be decreased in durability by the rim-hitting phenomenon.

It should be noted here that when a tube material is extrusion-molded by the extrusion process in the tire tube manufacturing process, the optimum extrusion speed for extruding each part of the tube material varies with the thickness of the tube material. Therefore, if a projection of a thick portion is provided on the wall surface of the tube for reinforcement, the optimum extrusion speed for the extrusion of the thick portion will differ from the optimum extrusion speed for the other portion, presenting the problem that the extrusion molding of the whole part of the tube material cannot be efficiently accomplished.

DISCLOSURE OF THE INVENTION

The present invention has been accomplished with the above circumstances in view, and it is an object of the present invention to provide a tire tube manufacturing method which enables manufacture of a tube material having a thick portion for reinforcement to be efficiently carried out.

To accomplish the above-described object, according to a first aspect and feature of the present invention, there is provided a tire tube manufacturing method for molding a tube material by an extrusion process and subsequently for vulcanizing the tube material by a vulcanizing process, in which the thickness of a tube body portion and the thickness of a rib-shaped projection are set substantially equal to each other when the tube material integrally having the tube body portion of an annular cross section and the rib-shaped projection extending in the longitudinal direction of and protruding from the tube body portion is extruded by the extrusion process.

With the above arrangement, not only the provision of the rib-shaped projection can prevent a decrease in tube durability caused by the rim-hitting phenomenon but also the approximate equalization of the thickness of the tube body portion and the thickness of the rib-shaped projection enables extrusion molding of the tube material to be efficiently accomplished.

Furthermore, according to a second aspect and feature of the present invention, in addition to the above-described arrangement, there is provided a tire tube manufacturing method in which the tube material has a plurality of rib-shaped projections which are disposed adjacent to each other.

With the above arrangement, the plurality of rib-shaped projections can effectively protect a wide range of the tube.

According to a third aspect and feature of the present invention, there is provided a tire tube manufacturing method for molding a tube material by an extrusion process and subsequently for vulcanizing the tube material by a vulcanizing process, in which the thickness of a tube body portion and the thickness of two rib-shaped projections are set substantially equal to each other when the tube material integrally having the tube body portion and the rib-shaped projections is extruded by the extrusion process, the tube body portion having an annular cross section, and the rib-shaped projections extending in the longitudinal direction of the tube body portion and protruding from an inner peripheral surface of the tube body portion, and in which base end portions of the rib-shaped projections are disposed at a higher level than tip end portions thereof when the tube material is vulcanized and molded by the vulcanizing process.

With the above arrangement, not only the provision of the rib-shaped projection can prevent a decrease in tube durability caused by the rim-hitting phenomenon but also the approximate equalization of the thickness of the tube body portion and the thickness of the rib-shaped projections enables the extrusion molding of the tube material to be efficiently accomplished. Besides, since the base end of the two rib-shaped projections is arranged at a higher level than the tip end portion thereof at the time of vulcanization molding of the tube material, it is possible to effectively protect a wide range of the tube by permitting the rib-shaped projections to be suspended by gravitation until they are situated along the inner peripheral surface of the tube body portion.

According to a fourth aspect and feature of the present invention, there is provided a tire tube integrally having a tube body portion of an annular cross section and the rib-shaped projection extending in the longitudinal direction of and projecting from the tube body portion, the thickness of the rib-shaped projection being substantially equal to that of the tube body portion.

With the above arrangement, the provision of the rib-shaped projection not only can prevent a decrease in tube durability caused by the rim-hitting phenomenon but also enables extrusion molding of the tube body portion of the tube material and rib-shaped projection to be carried out simultaneously and efficiently.

According to a fifth aspect and feature of the present invention, in addition to the fourth aspect and feature described above, there is provided a tire tube having a plurality of rib-shaped projections which are disposed adjacent to each other.

With the above arrangement, the same effect as that of the second aspect and feature can be obtained.

According to a sixth aspect and feature of the present invention, there is provided a tire tube integrally having a tube body portion of an annular cross section and two rib-shaped projections extending in the longitudinal direction of the tube body portion and protruding from an inner peripheral surface of the tube body portion, wherein the thickness of the tube body portion and the thickness of the rib-shaped projections are set substantially equal to each other, and the rib-shaped projections are arranged along the same circumferential direction as the tube body portion.

With the above arrangement, the same effect as that of the third aspect and feature can be obtained.

BRIEF DESCRIPTION OF THE DRAWINGS

FIG. 1 to FIG. 4 show the first embodiment of the present invention, wherein

FIGS. 5 to 10 show the second embodiment of the present invention, wherein

BEST MODE FOR CARRYING OUT THE INVENTION

The preferred embodiments of the present invention will hereinafter be described with reference to the accompanying drawings.

Figure 1:
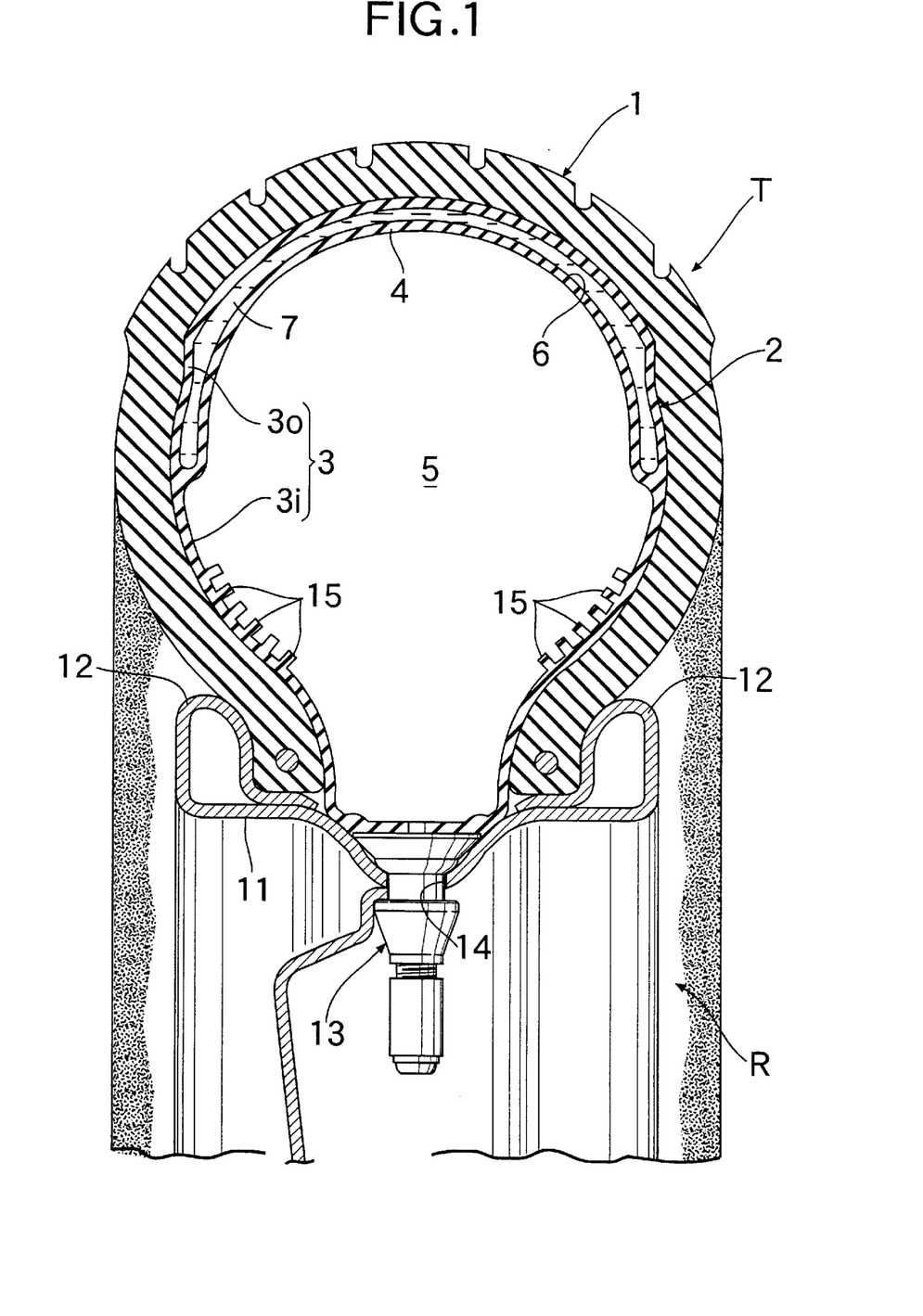
FIG. 1 is a cross-sectional view of a vehicle wheel mounted with a tube-incorporated tire.

As shown in FIG. 1, on a wheel rim R for a two-wheeled motorcycle is attached a tube-incorporated tire T which comprises a tire body 1 and a tube 2 housed therein. The tube 2 has a peripheral wall 3 of an annular cross section having an air chamber peripheral wall 3$i$ positioned inside in the radial direction and a sealant chamber peripheral wall 3$o$ located outside in the radial direction. A pair of connecting portions for connection between the air chamber peripheral wall 3$i$ and the sealant chamber peripheral wall 3$o$ of the peripheral wall 3 are connected to each other by a partition wall 4 formed integrally with the peripheral wall 3.

An air chamber 5 of an approximately round cross section defined between the air chamber peripheral wall 3$i$ and the partition wall 4 is filled with the air. In a sealant chamber 6 having an approximately circular cross section defined between the sealant chamber peripheral wall 3$o$ and the partition wall 4, a known liquid sealant 7 has been charged.

The rim R has an annular rim body 11 extending in the circumferential direction of the tube-incorporated tire T and a pair of flanges 12, 12 extending outside in the radial direction from opposite ends in the widthwise direction of the rim body 11 to hold an inner periphery of the tire 1. An air valve 13 through which the air is filled into the air chamber 5 defined within the tube 2 is supported through an air valve mounting section 14 formed in one portion in the circumferential direction of the rim body 11.

When the inside wall surfaces of the air chamber 5 abut against each other in case an impact load is applied to the tube-incorporated tire T, a plurality of rib-shaped projections 15 are provided on the inside wall surface of the air chamber peripheral wall 3$i$ of the tube 2 to prevent a decrease in the durability of the tube 2 by the load. The rib-shaped projections 15 projecting toward the center of the air chamber 5 are formed six in each of adjacent positions of a pair of flanges 12, 12 of the rim R, which extend closely to each other, endlessly and in parallel in the circumferential direction of the tube 2.

Figure 3:
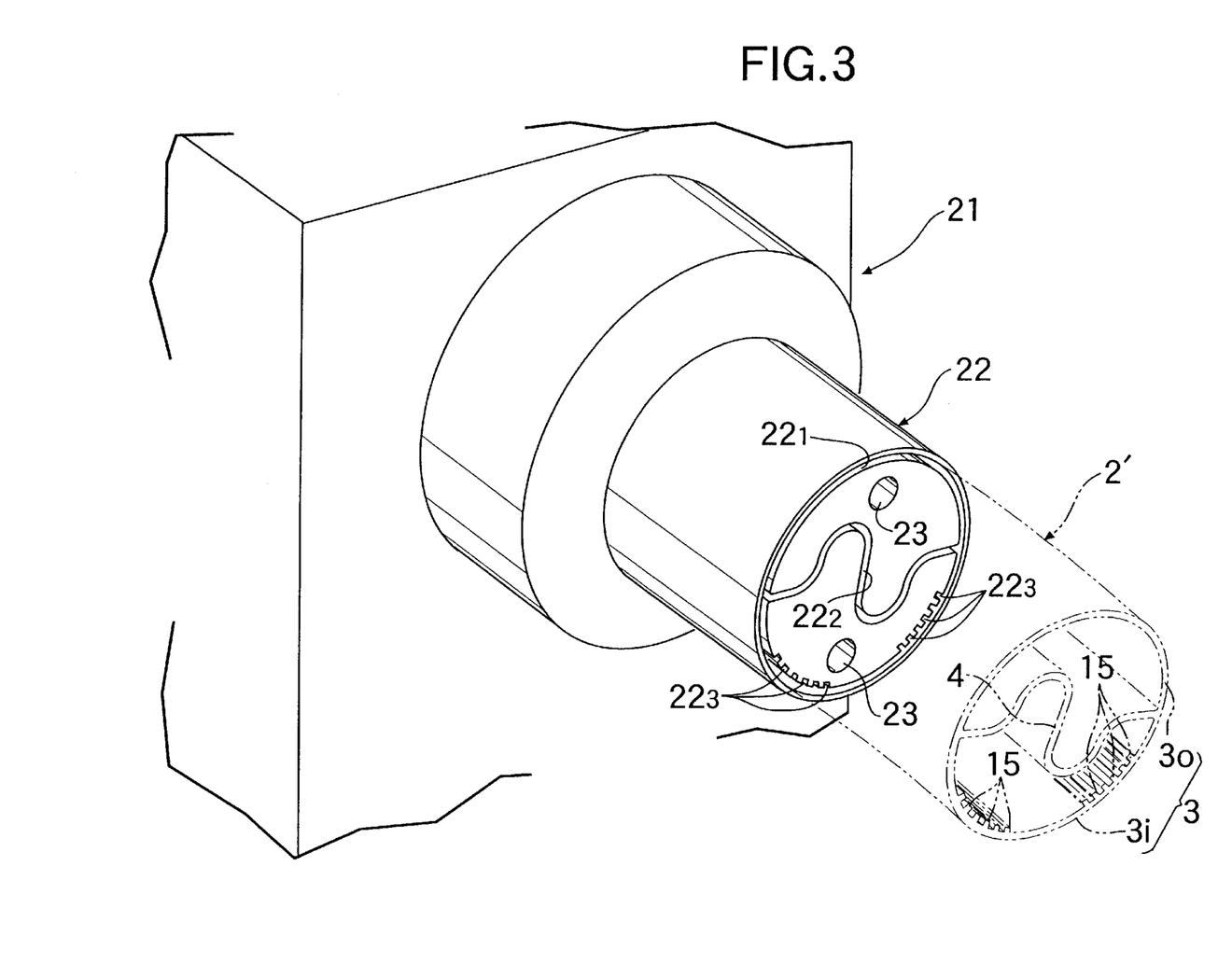
FIG. 3 is a view showing a tube material extrusion process.

FIG. 3 shows an extrusion molding machine 21 for extruding a tube material 2'. An extrusion nozzle 22 of the extrusion molding machine 21 is provided in a tip end thereof with a round slit $22_1$ forming the peripheral wall 3 as the tube body portion, an S-shaped slit $22_2$ forming the partition wall 4, and twelve slits $22_3$ forming the rib-shaped projections 15. Furthermore, the extrusion nozzle 22 has, in the tip end, a releasing agent supply ports 23, 23 for supplying talc as a releasing agent into the air chamber 5 and the sealant chamber 6.

Figure 4:
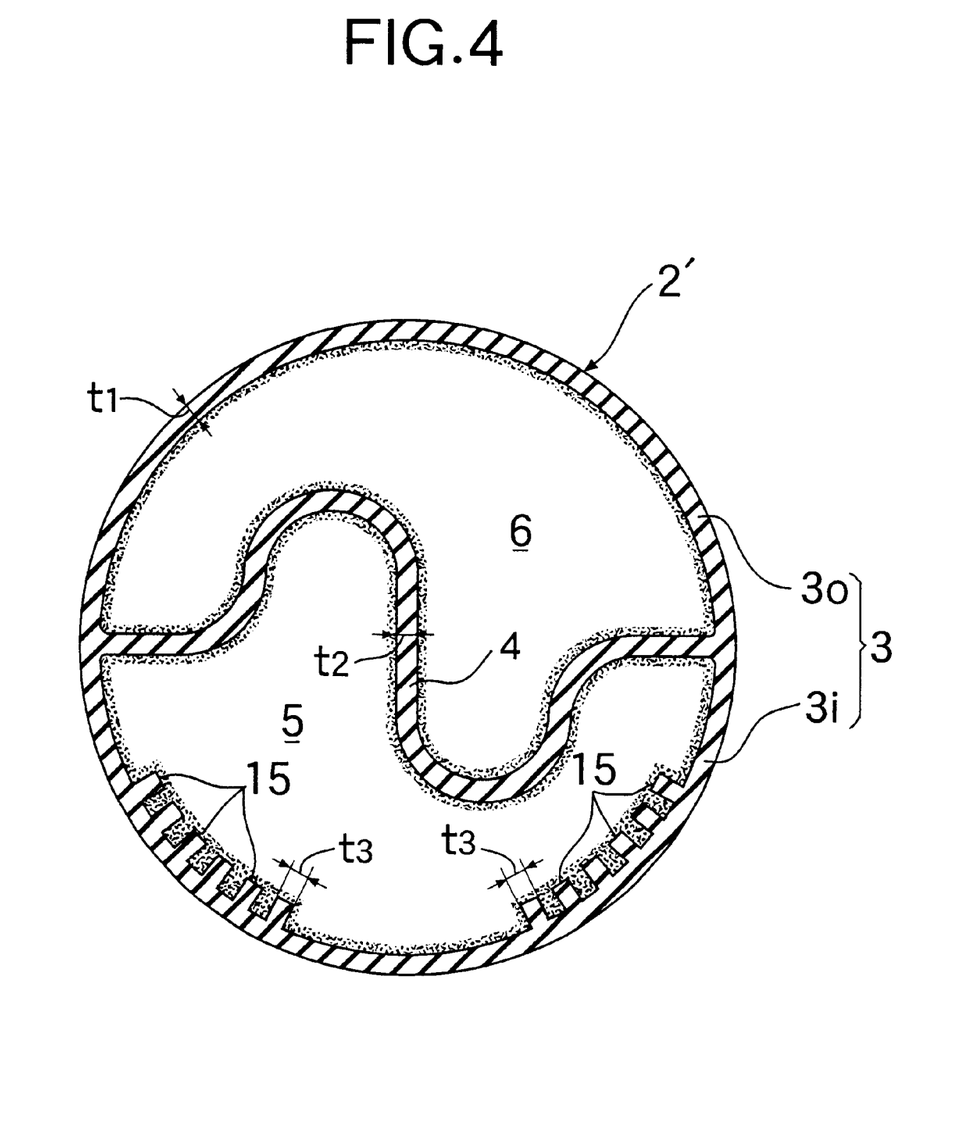
FIG. 4 is a sectional view of the tube material.

FIG. 4 is a cross sectional view of the tube material 2' extrusion-molded by the extrusion molding machine 21. As is clear from the drawing, the width of each of the slits $22_1$, $22_2$, $22_3$ and so forth of the extrusion nozzle 22 is set in order to equalize the thickness of each part of the tube material 2', i.e., the thickness $t_1$ of the peripheral wall 3 as the tube body portion, the thickness $t_2$ of the partition wall 4, and the thickness $t_3$ of the twelve rib-shaped projections 15 will be equal. It is, therefore, possible to perform efficient extrusion molding of each part of the tube material 2' at the optimum extrusion speed by setting the thickness of each part of the tube material 2' equal to one another.

The tube material 2' thus extrusion-molded is subsequently subjected to vulcanization and molding in the vulcanizing process after the extrusion process and then the sealant 7 is charged into the sealant chamber 6, thus finishing the tube 2.

The sealant chamber 6 of the tube 2 is held in a configuration along the inside surface of the tire body 1 by the air pressure in the air chamber 5. Therefore, if a centrifugal force acts, with the rotation of the vehicle wheel, on the sealant 7 filled in the sealant chamber 6, it is possible to prevent the sealant 7 from gathering to the outer peripheral side of the tube 2. Therefore, if the tube 2 is damaged with a nail or other in a radial direction or from the side, the sealant 7 is instantly filled in the damaged part for mending, thereby delaying air leakage from the air chamber 5. Also the sealant 7, being kept in the sealant chamber 6, will not flow out into the air chamber 5, and therefore will never adversely affect the operation of the air valve 13 and the pressure gage of the air valve 13.

Figure 2:
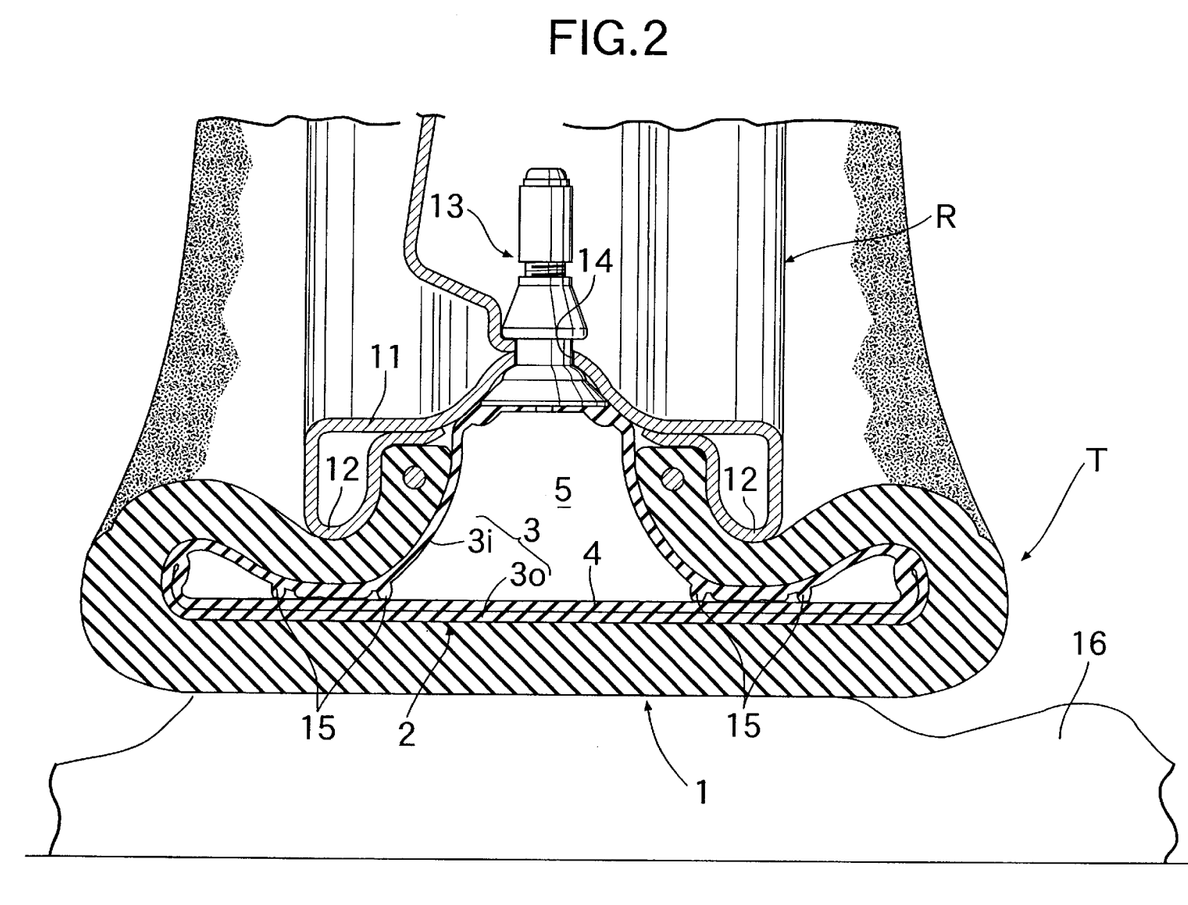
FIG. 2 is an explanatory view of operation showing the vehicle wheel running on an obstacle.

Next, as shown in FIG. 2, if the tube-incorporated tire T running on an obstacle 16 on a road receives an impact load, the flanges 12, 12 of the rim R radially compress the tire body 1 and the tube 2 due to the load. At this time, the tire body 1 and the tube 2 are pressed between the flanges 12, 12 of the rim R projecting radially outward and the obstacle 16; however, because of the shock absorbing effect of the rib-shaped projections 15 which are designed to be elastically deformed with ease, the air chamber peripheral wall 3$i$, sealant chamber peripheral wall 3$o$ and partition wall 4 of the tube 2 can be prevented from decreasing indurability. Furthermore, the provision of the plurality of rib-shaped projections 15 can effectively protect a wide range of the tube 2.

Therefore such a simple structure that the rib-shaped projections 15 are formed in a part of the tube 2 can prevent a decrease in the durability of the tube 2, and moreover the weight and the manufacturing cost of the tube-incorporated tire T will not increase.

Next, the second embodiment of the present invention will be described with reference to FIGS. 5 to 10.

Figure 5:
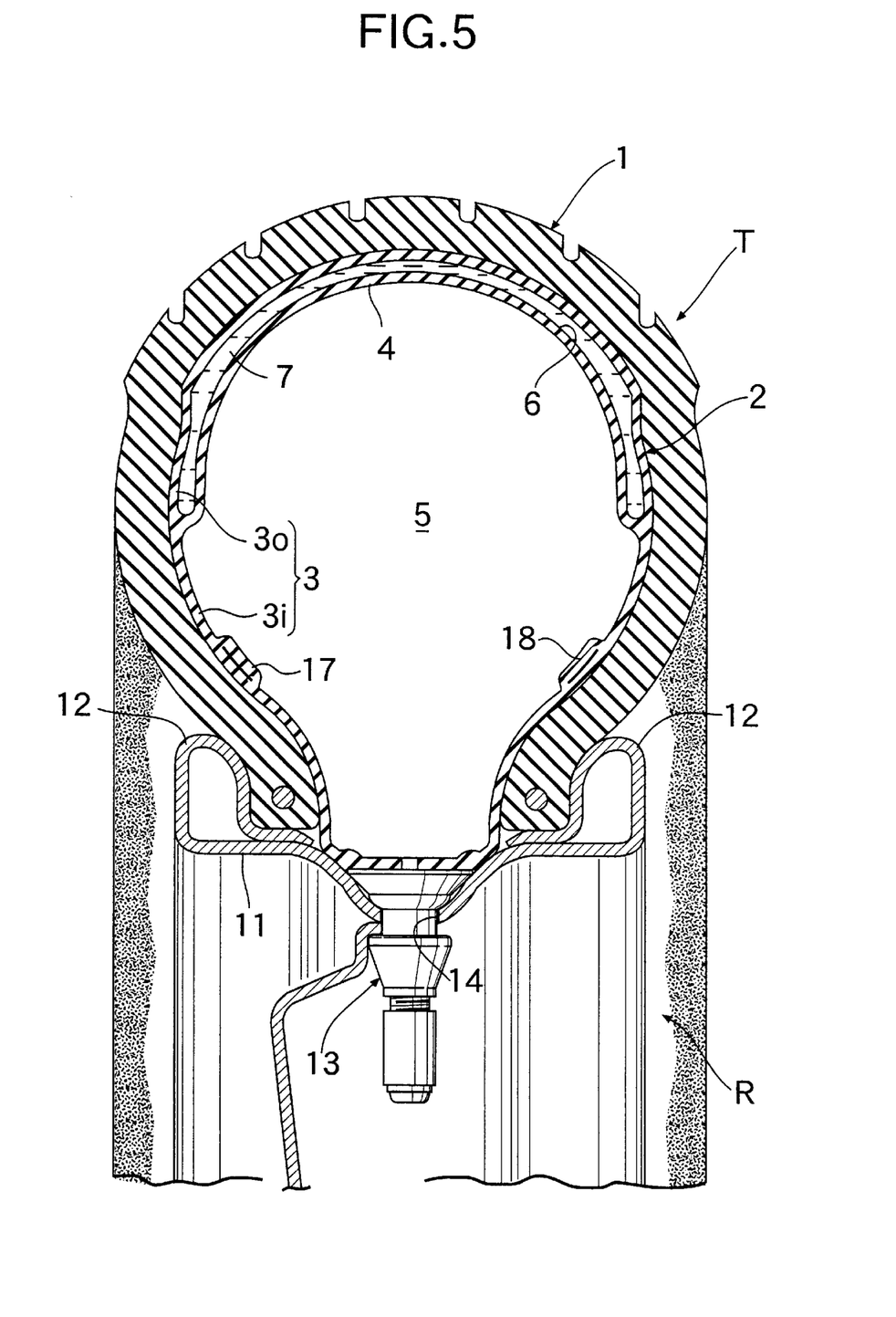
FIG. 5 is a cross-sectional view of a vehicle wheel mounted with a tube-incorporated tire.
Figure 6:
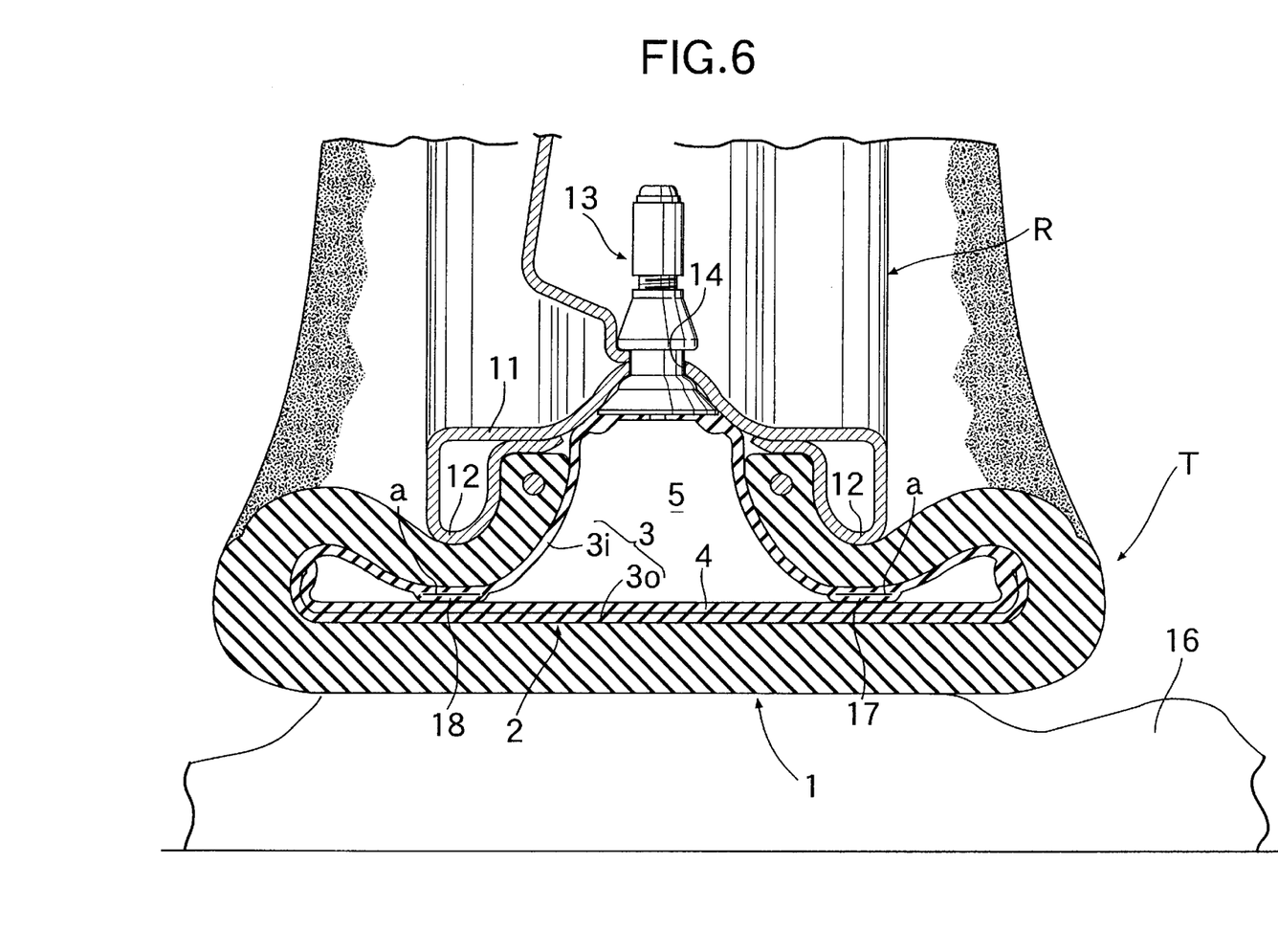
FIG. 6 is an explanatory view of operation showing the vehicle wheel running on an obstacle.

As shown in FIGS. 5 and 6, a tube 2 of the second embodiment has a pair of rib-shaped projections 17 and 18 in positions corresponding to the rib-shaped projections 15 of the tube 2 (see FIG. 1) of the first embodiment; these rib-shaped projections 17 and 18 have the same function and effect as the rib-shaped projections 15 of the first embodiment, to thereby prevent a decrease in the durability of the tube 2 even in case of rim hitting.

Figure 7:
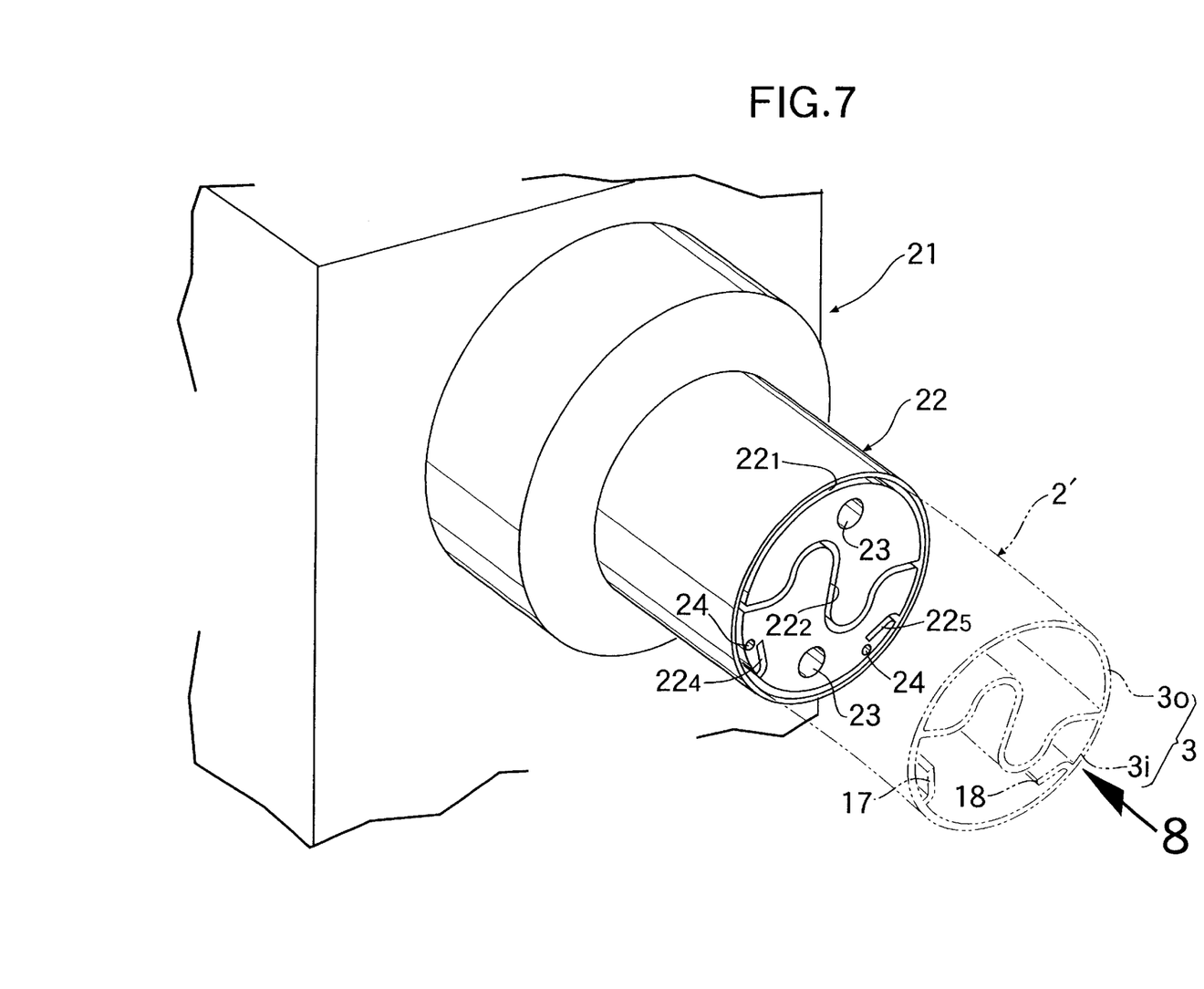
FIG. 7 is a view showing the tube material extrusion process.
Figure 8:
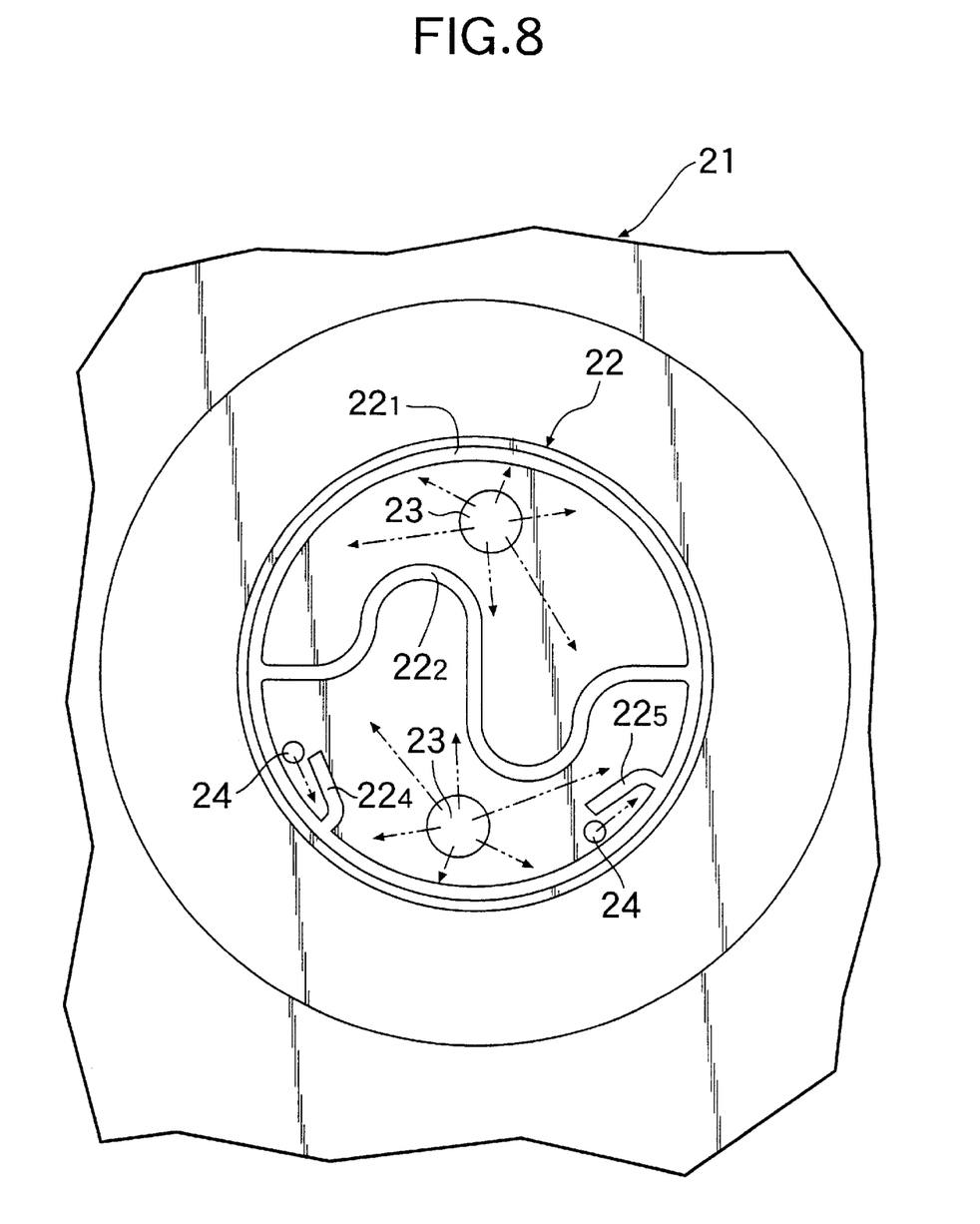
FIG. 8 is a view taken in the direction of an arrow 8 in FIG. 7.

As shown in FIGS. 7 and 8, a pair of J-shaped slits $22_4$ and $22_5$ are provided, in place of the twelve slits $22_3$ in the first embodiment, in a tip end of an extrusion nozzle 22 of an extrusion molding machine 21 of the second embodiment. Also in the tip end of the extrusion nozzle 22 a pair of small releasing agent supply ports 24, 24 in addition to the pair of releasing agent supply ports 23, 23 are provided correspondingly to tip end portions of the J-shaped slits $22_4$ and $22_5$, respectively.

Figure 9:
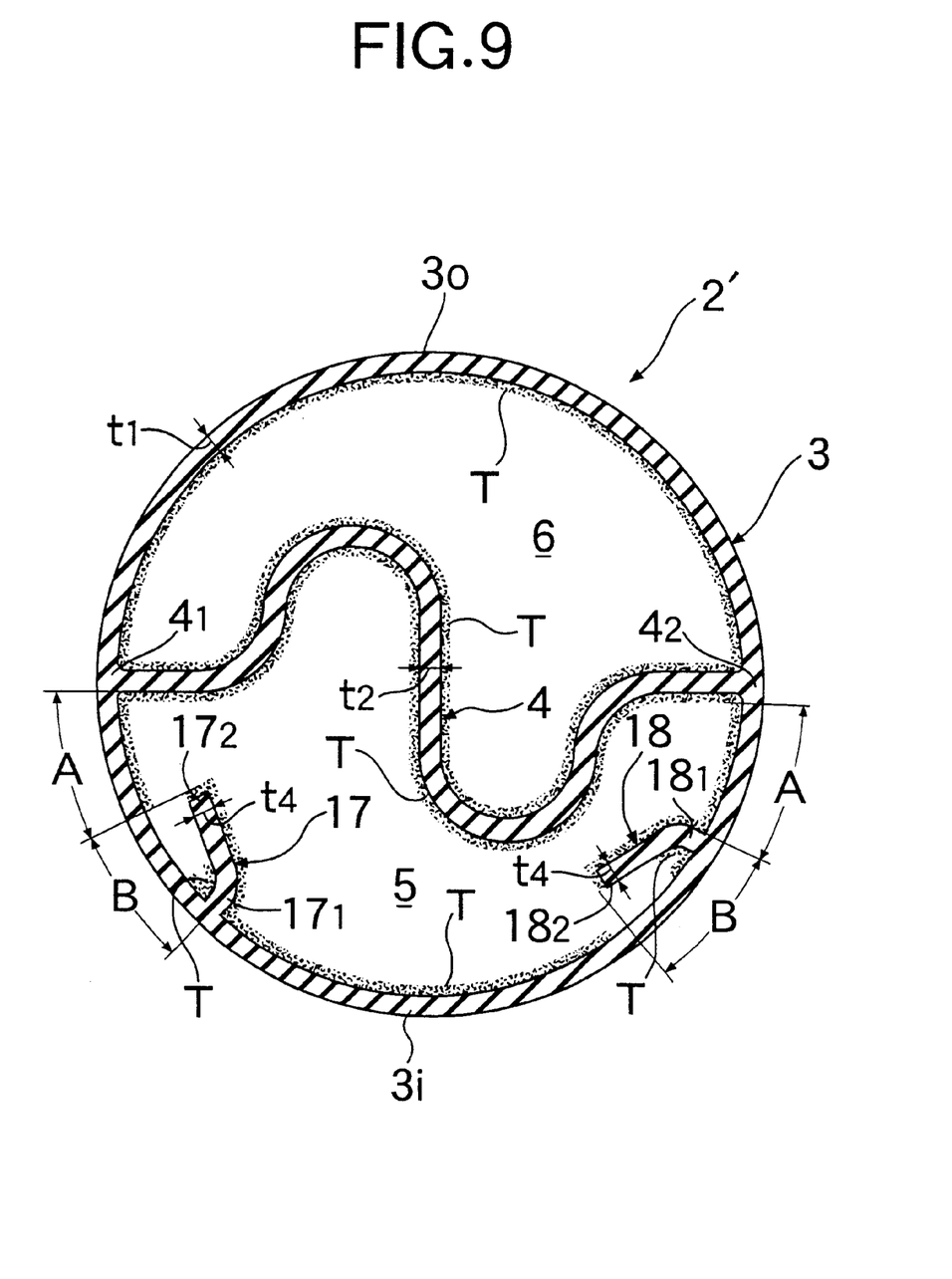
FIG. 9 is a sectional view of the tube material.

As is clear from FIG. 9, a tube material 2' of the second embodiment has a pair of asymmetrical rib-shaped projections 17 and 18 formed by the J-shaped slits $22_4$ and $22_5$. These projections 17 and 18 are inclined in the direction along an inside wall surface of an air chamber peripheral wall 3$i$. A base end portion $17_1$ of the rib-shaped projection 17 is in the position of the distance A+B apart from a root $4_1$ of a partition wall 4; accordingly, if B represents the height of the rib-shaped projection 17, a tip end portion $17_2$ is in the position of the distance A apart from the root $4_1$ of the partition wall 4. Therefore, a tip end portion $18_2$ of the rib-shaped projection 18 having the height B is in the position of the distance A+B apart from a root $4_2$ of the partition wall 4. The pair of rib-shaped projections 17 and 18 are asymmetrically arranged as stated above at the stage of the tube material 2'. Therefore the pair of rib-shaped projections 17 and 18 of the tube 2 after vulcanization and molding are finally arranged in symmetrical positions (see FIG. 1).

The width of each of the slits $22_1$, $22_2$, $22_4$ and $22_5$ of the extrusion nozzle 22 is set so that the thickness of each part of the tube material 2', that is, the thickness $t_1$ of the peripheral wall 3, the thickness $t_2$ of the partition wall 4, and the thickness $t_4$ of the pair of rib-shaped projections 17 and 18 will be equal to one another. Each part of the tube material 2' can be efficiently extrusion-molded at the optimum extrusion speed by thus setting the thickness of each part of the tube material 2' equal to one another.

The talc T supplied from the releasing agent supply ports 23, 23 located in the tip end of the extrusion nozzle 22 attaches on inside wall surfaces of an air chamber 5 and a sealant chamber 6 when the tube material 2' is extrusion-molded in the extrusion process. In this case, however, the talc T can hardly enter the spaces of V-shaped section located between an air chamber peripheral wall 3$i$ and the rib-shaped projections 17 and 18. Therefore, it becomes necessary to supply a small amount of talc T through the pair of small releasing agent supply ports 24, 24 so that the talc T will attach on bottoms of the spaces of V-shaped section.

Figure 10:
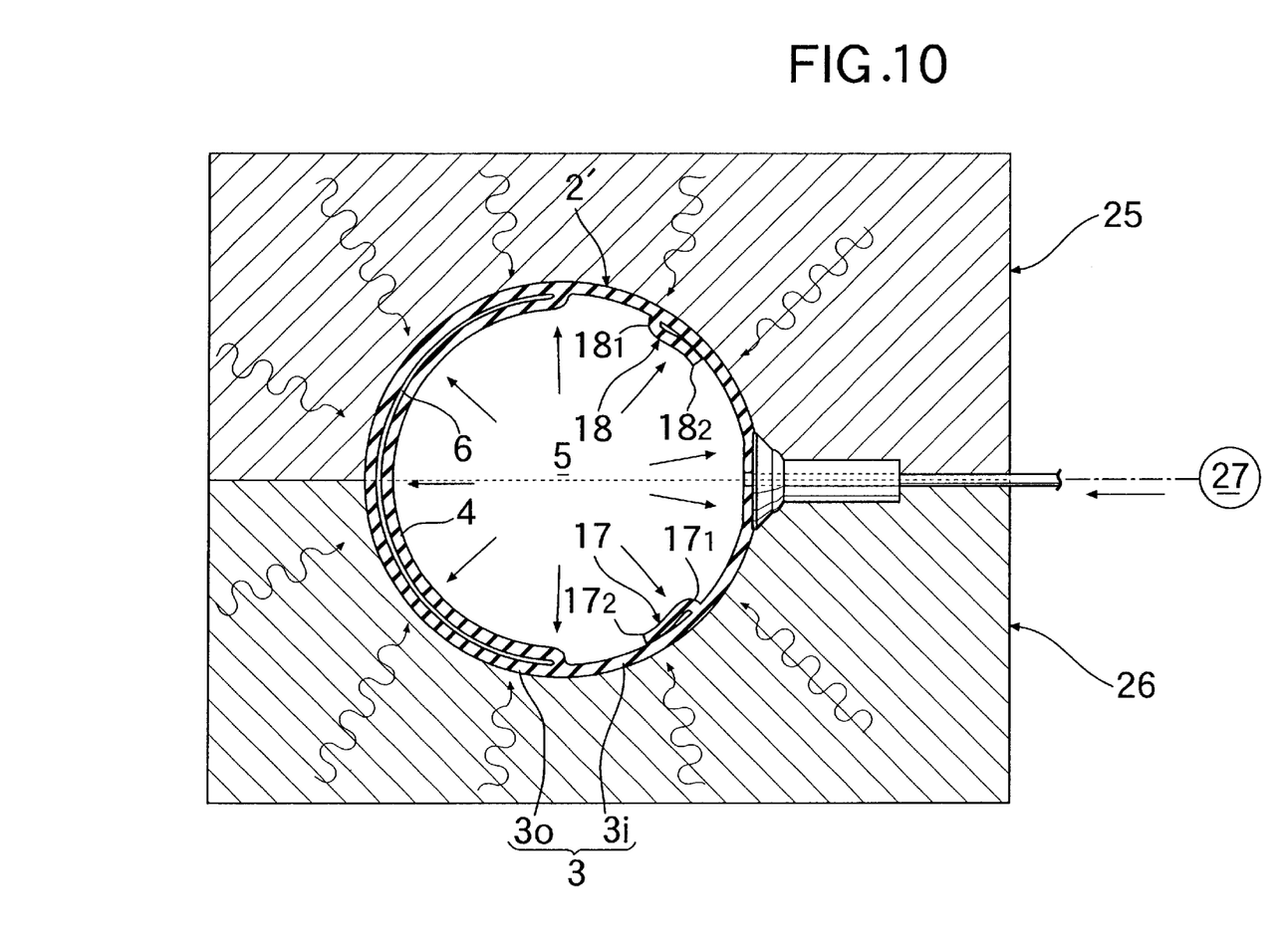
FIG. 10 is a view showing the tube vulcanizing process.

The extrusion-molded tube material 2' is cut to a predetermined length and fitted with an air valve 13; then its opposite ends are jointed into an annular form. In the subsequent vulcanizing process, as shown in FIG. 10, the annular tube material 2' is inserted horizontally between an upper die 25 and a lower die 26 of a heating die, which are then heated while supplying high-temperature air (or high-temperature steam) from a hot air supply source 27 through the air valve 13, thus vulcanizing and molding the tube material 2'.

At this time, the partition wall 4 is held in firm contact with the sealant chamber peripheral wall 3$o$ by the air pressure supplied from the air chamber 5, but is prevented from jointing with the sealant chamber peripheral wall 3$o$ because of the presence of the talc T which is the releasing agent. The tip end portion $17_2$ of the lower rib-shaped projection 17, being located at a lower level than the base end portion $17_1$, automatically abuts against the air chamber peripheral wall 3$i$ with the gravity. At this time, since a small amount of talc T supplied through the small releasing agent supply port 24 is attached to the vicinity of the base end portion $17_1$ of the rib-shaped projection 17, only the vicinity of the tip end portion $17_2$ of the rib-shaped projection 17 where no talc T is attached is jointed by vulcanization to the air chamber peripheral wall 3$i$.

In the meantime, the tip end portion $18_2$ of the upper rib-shaped projection 18, being positioned at a lower level than the base end portion $18_1$, is allowed to be suspended by the gravity a little away from the air chamber peripheral wall 3$i$, but is pressed into firm contact with the air chamber peripheral wall 3$i$ with the air pressure supplied to the air chamber 5. Accordingly only the vicinity of the tip end portion $18_2$ of the rib-shaped projection 18 where no talc T is attached is vulcanized to be jointed to the air chamber peripheral wall 3$i$.

The tube 2 thus completed increases in flexibility to thereby further improve durability because of the presence of a non-jointed portion (see "a" portion in FIG. 6) between the rib-shaped projections 17 and 18 and the air chamber peripheral wall 3$i$.

Figure 11:
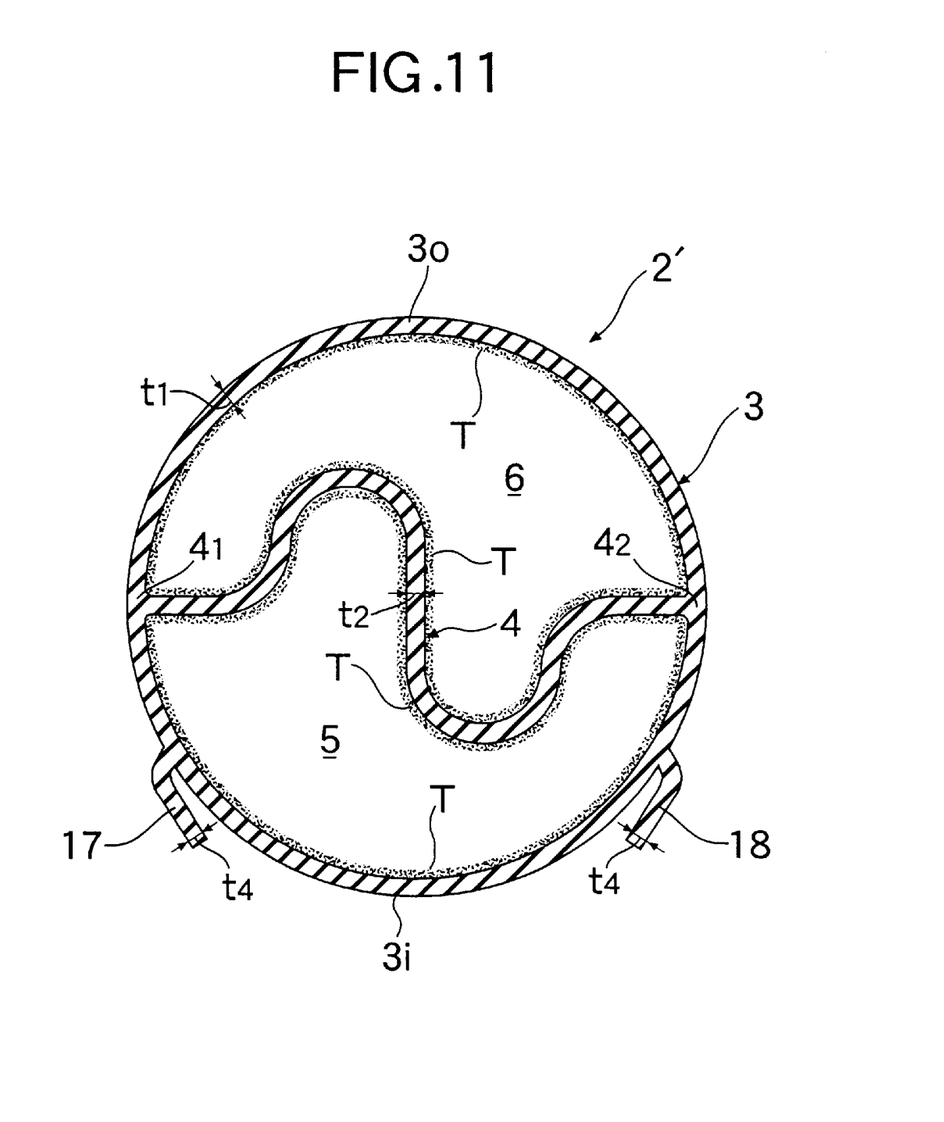
FIG. 11 is a sectional view of a tube material according to the third embodiment of the present invention.

FIG. 11 shows the third embodiment of the present invention.

As is clear from a comparison with FIG. 9 which shows the second embodiment, a tube material 2' of the third embodiment is provided with a pair of rib-shaped projections 17 and 18 protruding to an outside wall surface of an air chamber peripheral wall 3$i$. Each of the rib-shaped projections 17 and 18 has a form symmetrical to each other. The thickness $t_4$ of the rib-shaped projections 17 and 18 is set equal to the thickness of other portions of the tube material 2', i.e., the thickness $t_1$ of a peripheral wall 3 and the thickness $t_2$ of a partition wall 4; therefore it is also possible to carry out efficient extrusion molding of each part of the tube material 2' at the optimum extrusion speed according to the present embodiment.

The provision of a recess, in which the rib-shaped projections 17 and 18 fit, in an upper die 25 and a lower die 26 of the heating die allows projection of the rib-shaped projections 17 and 18 to the outside wall surface of the air chamber peripheral wall 3$i$ of the finished tube 2 at the time of vulcanization molding of the tube material 2' of the present embodiment; and also the provision of flat molded surfaces in the upper die 25 and the lower die 26 of the heating die allows the formation of projections, correspondingly to the rib-shaped projections 17 and 18, on the inside wall surface of the air chamber peripheral wall 3$i$ of the finished tube 2.

The tube 2 of the first embodiment shown in FIG. 1 has the rib-shaped projections 15 on the inside wall surface of the air chamber peripheral wall 3i. The rib-shaped projections 15 can be protrusively formed on the outside wall surface of the air chamber peripheral wall 3i by the manufacturing method shown in FIG. 12 and FIG. 13. This manufacturing method, however, is not included in the present invention.

Figure 12:
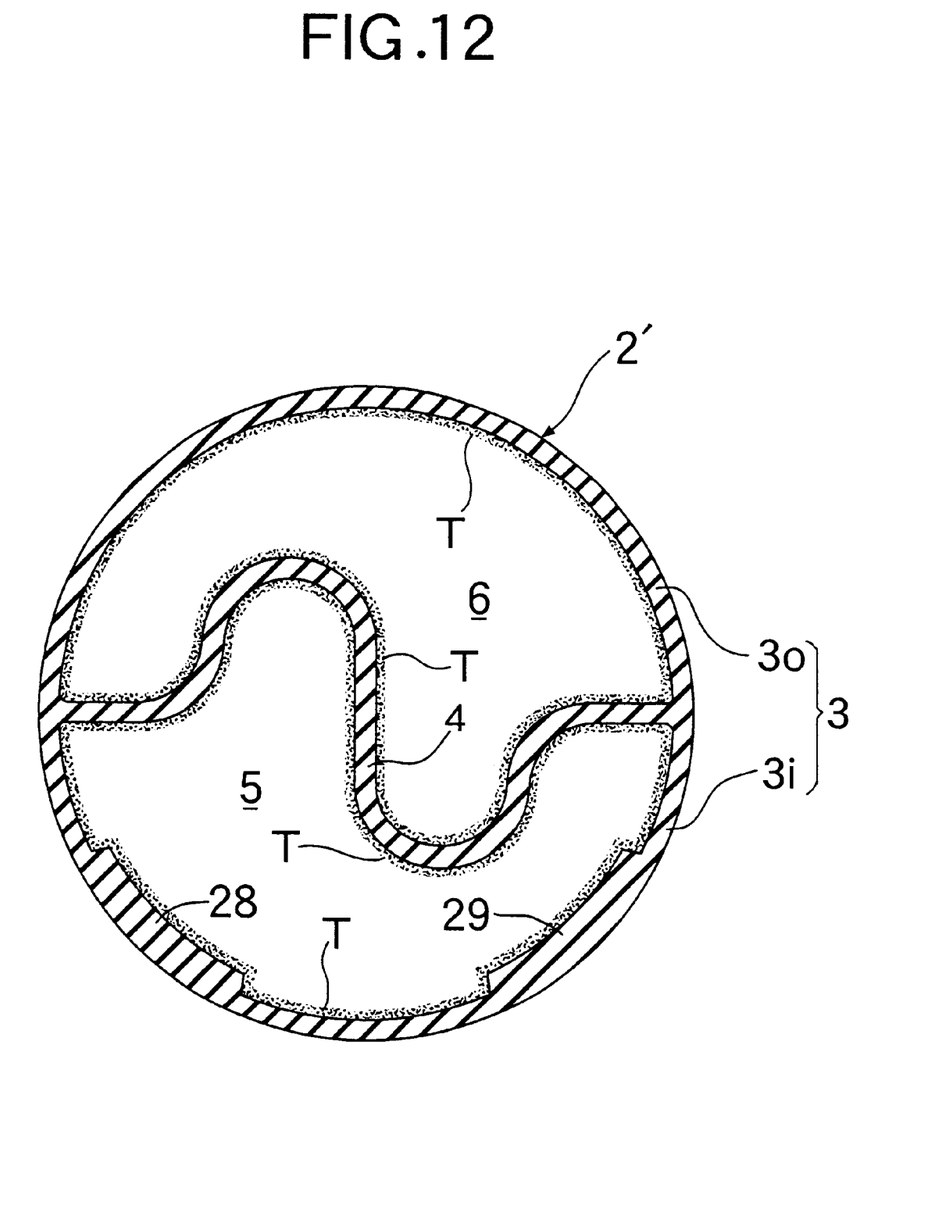
FIG. 12 is a sectional view of the tube material according to another manufacturing method.
Figure 13:
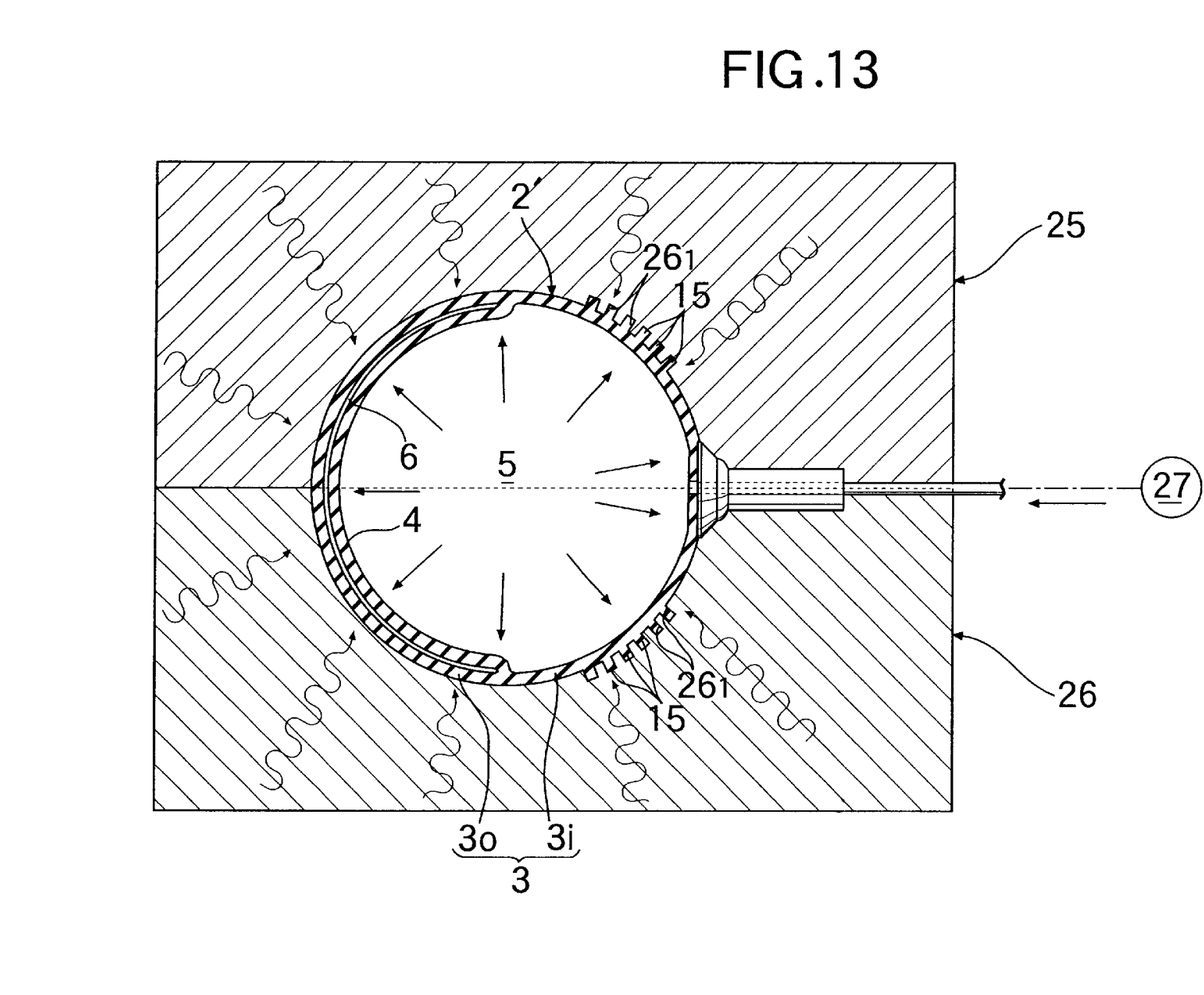
FIG. 13 is a view showing the tube material vulcanizing process according to a further manufacturing method.

First, thick portions 28 and 29 are formed in advance at two points on the air chamber peripheral wall 3i at the time of extrusion molding of the tube material 2' shown in FIG. 12. Then, in vulcanization molding using the heating die shown in FIG. 13, the thick portions 28 and 29 are partly pressed by the pressure of high-pressure air into a plurality of recesses $25_1$ and $26_1$ formed in the molded surfaces of the upper die 25 and the lower die 26, thereby enabling the rib-shaped projection 15 projecting outwardly from the air chamber peripheral wall 3i to be formed.

While preferred embodiments of the present invention are shown and described hereinabove, it will be understood that the present invention is not limited thereto since various changes and modifications may be made within the true spirit and scope of the present invention.

For instance, the tube 2 filled with the sealant has been described in the present embodiments; the present invention, however, is applicable also to a common tube 2 not filled with the sealant. The rib-shaped projections 15 of the first embodiment protrude toward the inside of the tube 2 but may be protruded outward or both inward and outward. Furthermore, in the second embodiment, only portions of the rib-shaped projections 17 and 18 in the vicinity of the tip portions $17_2$ and $18_2$ are attached on the air chamber peripheral wall 3i but the entire portions of the rib-shaped projections may be attached on the air chamber peripheral wall 3i, and further may be reformed to be set along the air chamber peripheral wall 3i without jointing.

What is claimed is:

1. A tire tube manufacturing method for molding a tube material comprising the steps of:

extruding a tube material such that a wall thickness of a tube body portion and a wall thickness of a rib-shaped projection protruding from the tube body portion so as to have a free tip end, the thickness of the projection being substantially uniform and in a cross-sectional circumferential direction of the tube body portion, are set substantially equal to each other when said tube material integrally having said tube body portion of an annular cross section and said rib-shaped projection extending in the longitudinal direction of said tube body portion is extruded; and vulcanizing said extruded tube material.

2. A tire tube manufacturing method according to claim 1, further comprising the step of:

extruding said tube material such that said tube material has a plurality of rib-shaped projections disposed adjacent to each other.

3. A tire tube manufacturing method for molding a tube material comprising the steps of:

extruding a tube material such that the wall thickness of a tube body portion and the wall thickness of two rib-shaped projections protruding from an inner peripheral surface of the tube body portion so as to have free tip ends, respectively, the thickness of each of the projections being substantially uniform and in a cross-sectional circumferential direction of the tube body portion, are set substantially equal to each other when said tube material integrally having said tube body portion of an annular cross section and said two rib-shaped projections extending in the longitudinal direction of said tube body portion is extruded, and vulcanizing said extruded tube material while positioning a base end portion of each of said rib-shaped projections at a higher level than said free tip end in a state of the tube material being vulcanized and molded, as viewed in a direction vertical to the cross section of the tube body portion.

4. A tire tube, integrally molded to have a tube body portion of an annular cross section, and a rib-shaped projection extending in the longitudinal direction of and protruding from said tube body portion, so as to have a free tip end and a substantially uniform wall thickness over the length thereof, the thickness of the projection being in a cross-sectional circumferential direction of the tube body portion, and the wall thickness of the rib-shaped projection being substantially equal to that of said tube body portion.

5. A tire tube according to claim 4, having a plurality of rib-shaped projections which are disposed adjacent to each other.

\* \* \* \* \*